US012066771B2

(12) United States Patent
Wakisaka

(10) Patent No.: US 12,066,771 B2
(45) Date of Patent: Aug. 20, 2024

(54) DEVELOPING APPARATUS HAVING AIR DISCHARGE

(71) Applicant: CANON KABUSHIKI KAISHA, Tokyo (JP)

(72) Inventor: Masashi Wakisaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/376,300

(22) Filed: Jul. 15, 2021

(65) Prior Publication Data

US 2022/0035271 A1 Feb. 3, 2022

(30) Foreign Application Priority Data

Jul. 29, 2020 (JP) ................................ 2020-128591
Jun. 29, 2021 (JP) ................................ 2021-107354

(51) Int. Cl.
*G03G 15/08* (2006.01)
*G03G 15/09* (2006.01)
*G03G 21/20* (2006.01)

(52) U.S. Cl.
CPC ..... *G03G 15/0891* (2013.01); *G03G 15/0882* (2013.01); *G03G 15/0893* (2013.01);
(Continued)

(58) Field of Classification Search
CPC ............... G03G 15/0891; G03G 15/09; G03G 2215/0609; G03G 2215/0819;
(Continued)

(56) References Cited

U.S. PATENT DOCUMENTS 6,496,664 B1 * 12/2002 Ogata ................ G03G 15/0853 399/30
8,023,855 B2 * 9/2011 Hattori ................ G03G 21/206 399/92
(Continued)

FOREIGN PATENT DOCUMENTS

JP 2004-252193 A 9/2004
JP 2007-140288 A 6/2007
(Continued)

*Primary Examiner* — Arlene Heredia
*Assistant Examiner* — Laura Roth
(74) *Attorney, Agent, or Firm* — VENABLE LLP

(57) ABSTRACT

A developing apparatus includes a developing container to accommodate a developer and having first and second chambers divided by a partition wall for supplying the developer to a rotatable developing member and first and second communicating portions to allow the developer to move between first and second chambers by conveyance screws. A third communicating portion is disposed between the first and second communicating portions and above the conveyance screws to allow air inside the developing container to move between the first chamber and the second chamber. The developing container further includes a third chamber disposed above the second chamber in the vertical direction and accommodates initial developer in an unused state of the developing apparatus, and an opening portion for discharging the air inside the developing container to outside of the developing container is provided in the third chamber, with the opening being disposed above the third chamber.

9 Claims, 11 Drawing Sheets

(52) U.S. Cl.
CPC ........... *G03G 15/09* (2013.01); *G03G 21/206* (2013.01); *G03G 2215/0609* (2013.01); *G03G 2215/0687* (2013.01); *G03G 2215/0819* (2013.01); *G03G 2215/0827* (2013.01); *G03G 2215/0838* (2013.01)

(58) Field of Classification Search
CPC ....... G03G 2215/0827; G03G 15/0893; G03G 15/0882; G03G 15/0884; G03G 15/0881; G03G 2215/0687; G03G 2215/069; G03G 2215/0838; G03G 2215/0841; G03G 21/206
See application file for complete search history.

(56) References Cited

U.S. PATENT DOCUMENTS

| | | | | |
|---|---|---|---|---|
| 2007/0081832 | A1* | 4/2007 | Yoshida | G03G 15/0822 399/256 |
| 2014/0270838 | A1* | 9/2014 | Yoshizawa | G03G 15/0893 399/99 |
| 2017/0115606 | A1* | 4/2017 | Sakamaki | G03G 15/0891 |
| 2018/0253030 | A1* | 9/2018 | Sako | G03G 15/0872 |
| 2018/0284650 | A1* | 10/2018 | Shigehiro | G03G 15/0887 |

FOREIGN PATENT DOCUMENTS

| | | | |
|---|---|---|---|
| JP | 2009-223075 | A | 10/2009 |
| JP | 2009251450 | A | 10/2009 |

* cited by examiner

DEVELOPING APPARATUS HAVING AIR DISCHARGE

BACKGROUND OF THE INVENTION

Field of the Invention

This invention relates to a developing apparatus using a developer containing a toner and a carrier.

Description of the Related Art

A developing apparatus includes a developing container accommodating a developer containing a toner and a carrier, and a rotatable developing member bearing and conveying the developer so as to develop an electrostatic latent image formed on an image bearing member. The developing container includes a partition wall, a first chamber (supply chamber) supplying the developer to the rotatable developing member, and a second chamber (agitating chamber) separated from the first chamber by the partition wall and circulating the developer to and from the first chamber. In an opening portion of the first chamber, the rotatable developing member is disposed.

In the developing apparatus, an air flow flows into the developing container by rotation of the rotatable developing member via a gap between the opening portion of the first chamber and the rotatable developing member. In a case where internal pressure inside the developing container is increased by an inflow of the air into the developing container, there is a risk that the air inside the developing container is discharged outside the developing container and scatters the toner at that time.

In a developing apparatus described in Japanese Patent Application Publication No. 2007-140288, the opening portion through which the air is able to pass so as to decrease the internal pressure inside the developing container (hereinafter referred to as a pressure release opening portion) is disposed in the upper direction of the first chamber, and a filter is disposed at the opening portion for the pressure release.

However, since the air inside the first chamber (supply chamber) contains a large quantity of a toner released from the rotatable developing member, a toner density is high. Therefore, in a case of a configuration described in Japanese Patent Application Publication No. 2007-140288, there is a tendency that the quantity of the toner contained in the air discharged from the inside of the developing container to the outside of the developing container via the pressure release opening portion disposed in the upper direction of the first chamber increases. Further, in a case where the filter is disposed in the pressure release opening portion disposed in the upper direction of the first chamber, since the filter disposed in the pressure release opening portion becomes easily clogged by the toner, shortening of a life of the filter is concerned.

SUMMARY OF THE INVENTION

This disclosure provides a developing apparatus capable of reducing a toner contained in air discharged from the inside of a developing container to the outside of the developing container via an opening portion through which the air is able to pass.

According to one aspect of the present invention, a developing apparatus incudes a rotatable developing member configured to bear and convey developer containing a toner and a carrier so as to develop an electrostatic latent image formed on an image bearing member, a developing container configured to accommodate the developer, the developing container comprising a first chamber supplying the developer to the rotatable developing member, a second chamber, and a partition wall separating the first chamber and the second chamber, the developer circulating between the first chamber and the second chamber, a first communicating portion configured to allow the developer to move from the second chamber to the first chamber, a second communicating portion configured to allow the developer to move from the first chamber to the second chamber, a first conveyance screw disposed in the first chamber, and configured to convey the developer in a first direction from the first communicating portion toward the second communicating portion, a second conveyance screw disposed in the second chamber, and configured to convey the developer in a second direction from the second communicating portion toward the first communicating portion, and a third communicating portion disposed downstream of the first communicating portion and upstream of the second communicating portion in the first direction, disposed above a rotational axis of the first conveyance screw and a rotational axis of the second conveyance screw in a vertical direction, and configured to allow air inside the developing container to move between the first chamber and the second chamber. An opening portion for discharging the air inside the developing container outside the developing container is disposed above the second chamber in the vertical direction.

Further features of the present invention will become apparent from the following description of exemplary embodiments with reference to the attached drawings.

DESCRIPTION OF THE EMBODIMENTS

Using FIGS. 1 through 11, an embodiment will be described. First, using FIGS. 1 and 2, a schematic configuration of an image forming apparatus of the present embodiment will be described.

Image Forming Apparatus

An image forming apparatus 100 of the present embodiment is a tandem type full color printer of an electrophotographic system having four image forming units PY, PM, PC, and PK each including a photosensitive drum 1, serving as an image bearing member. The image forming apparatus 100 forms a toner image on a recording material in accordance with an image signal transmitted from a document reading apparatus (not shown) coupled to an apparatus body 100A or a host apparatus such as a personal computer connected to the apparatus body 100A in a manner capable of communicating with the apparatus body 100A. The recording material includes a sheet material such as a paper, a plastic film, and a cloth. Further, the image forming units PY, PM, PC, and PK respectively form the toner images of yellow, magenta, cyan, and black.

To be noted, the four image forming units PY, PM, PC, and PK included in the image forming apparatus 100 are substantially the same in configurations except for a difference in a color of developer. Accordingly, the image forming unit PY will be described as a representative, and descriptions of the other image forming units will be omitted herein.

Figure 2:
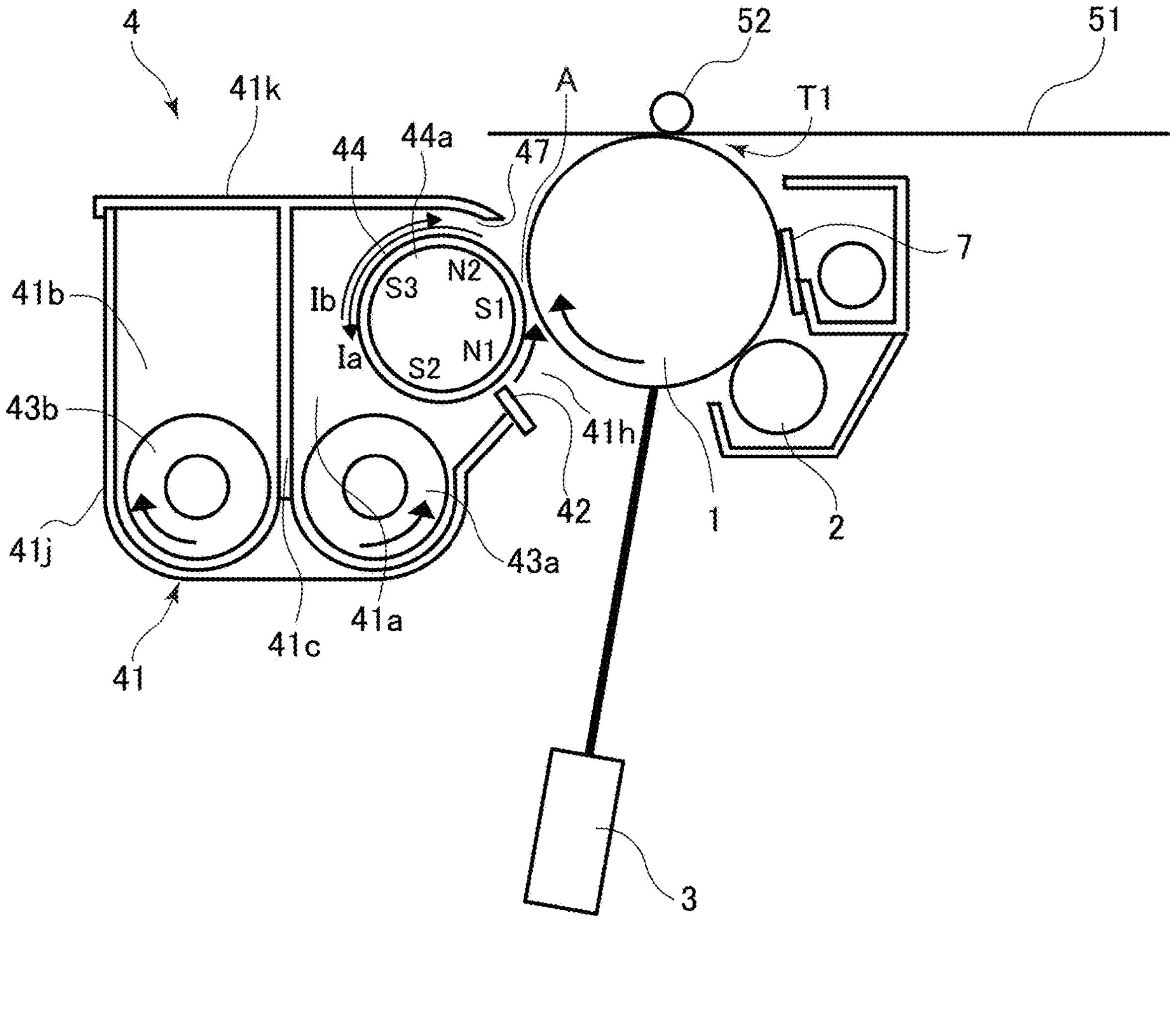
FIG. 2 is a schematic cross-sectional view showing a configuration of an image forming unit of the embodiment.

As shown in FIG. 2, a cylindrically shaped photosensitive member, serving as the image bearing member, that is, the photosensitive drum 1 is disposed in the image forming unit PY. The photosensitive drum 1 is rotatably driven in an arrow direction in the figure. Around the photosensitive drum 1, a charge roller 2, serving as a charge unit, a developing apparatus 4, a primary transfer roller 52, serving as a transfer unit, and a cleaning unit 7, are disposed. In the lower direction of the photosensitive drum 1 in the figure, an exposing unit 3 (laser scanner in the present embodiment), is disposed.

Figure 1:
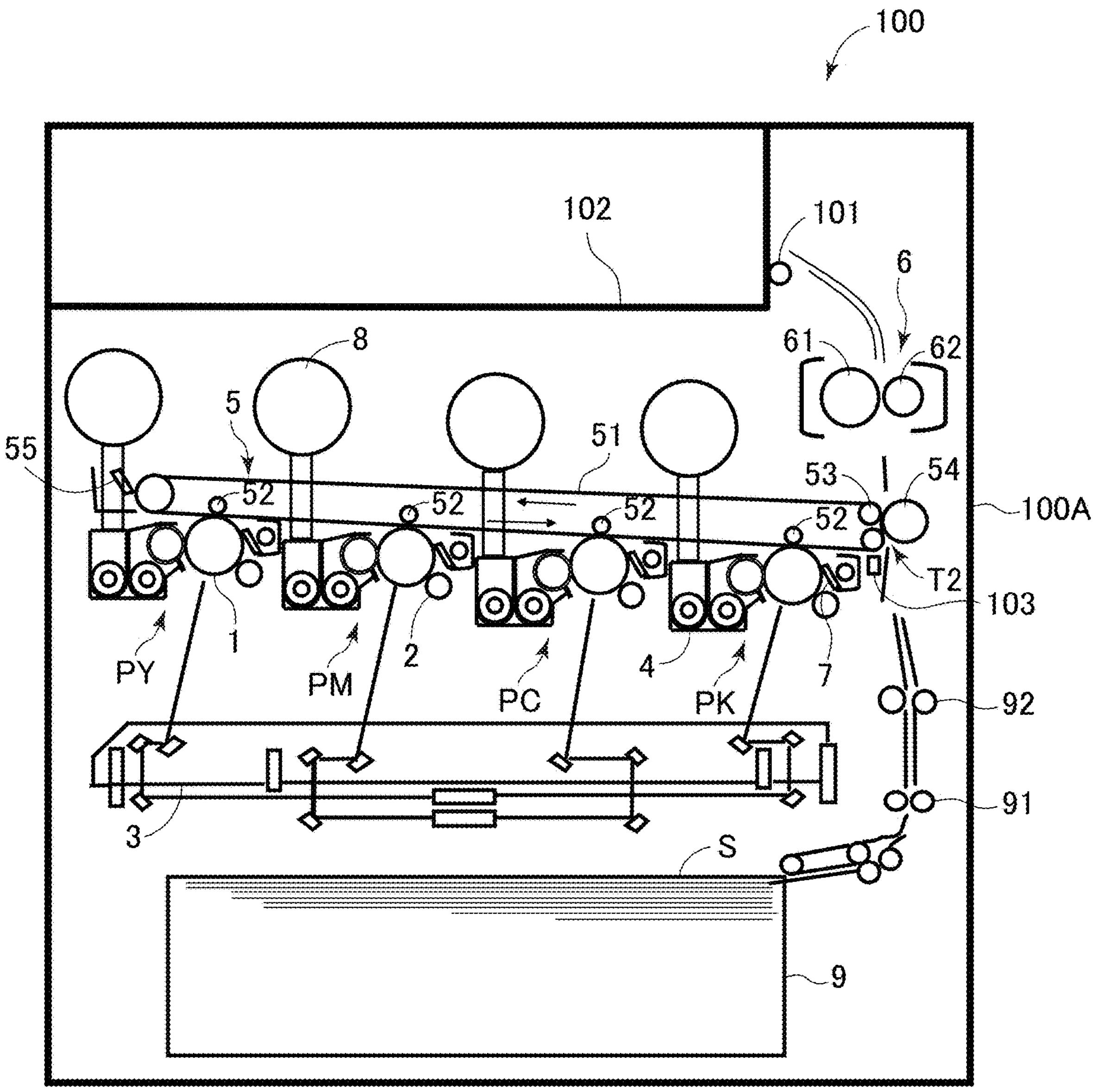
FIG. 1 is a schematic cross-sectional view showing a configuration of an image forming apparatus of an embodiment.

In the upper direction of each of the image forming units in FIG. 1, a transfer apparatus 5 is disposed. As the transfer apparatus 5, an endless shaped intermediate transfer belt 51 is stretched over a plurality of rollers, and configured to move in an arrow direction in a circulating manner (rotation). Further, the intermediate transfer belt 51 bears and conveys the toner image primarily transferred to intermediate transfer belt 51 as described later. A secondary transfer outer roller 54 among the plurality of rollers stretching the intermediate transfer belt 51 is disposed at a position facing a secondary transfer inner roller 53 across the intermediate transfer belt 51. Then, the secondary transfer outer and inner rollers 54 and 53 constitute a secondary transfer portion T2 transferring the toner image on the intermediate transfer belt 51 onto the recording material. A fixing unit 6 is disposed downstream of the secondary transfer portion T2 in a recording material conveyance direction.

In the lower part of the image forming apparatus 100, a cassette 9 storing the recording material S is disposed. The recording material S fed from the cassette 9 is conveyed toward a registration roller 92 by a conveyance roller 91. Then, a leading edge of the recording material S abuts onto the registration roller 92 in a stopping state, and the recording material S is corrected for a skew by forming a loop. Thereafter, the registration roller 92 starts rotation in a timing synchronizing with the toner image on the intermediate transfer belt 51, and the recording material S is conveyed to the secondary transfer portion T2.

A process, for example, to form full color images of four colors performed by the image forming apparatus 100 configured as described above will be described. First, when an image forming operation is started, a surface of the rotatable photosensitive drum 1 is uniformly charged by the charge roller 2. Then, the photosensitive drum 1 is exposed with a laser beam irradiated by the exposing unit 3 in accordance with the image signal. Herewith, an electrostatic latent image corresponding to the image signal is formed on the photosensitive drum 1. The electrostatic latent image on the photosensitive drum 1 is developed and visualized by a toner, serving as the developer, accommodated inside the developing apparatus 4.

The toner image formed on the photosensitive drum 1 is primarily transferred to the intermediate transfer belt 51 at a primary transfer portion T1 (refer to FIG. 2) formed between the photosensitive drum 1 and the primary transfer roller 52 disposed across the intermediate transfer belt 51. At this time, a primary transfer bias is applied to the primary transfer roller 52. The toner remained on the photosensitive drum 1 after the primary transfer (transfer residual toner) is removed by the cleaning unit 7.

These operations as described above are performed at each of the image forming units of yellow, magenta, cyan, and black in sequence, and the toner images of the four colors are superimposed on the intermediate transfer belt 51. Thereafter, the recording material S is conveyed to the secondary transfer portion T2 in a timing synchronizing with the toner image forming process. Then, by applying a secondary transfer bias to the secondary transfer outer roller 54, the toner images of four colors on the intermediate transfer belt 51 are secondarily transferred to the recording material S collectively. The toner remaining on the intermediate transfer belt 51 after the secondary transfer is removed by an intermediate transfer belt cleaner 55.

Then, the recording material S is conveyed to the fixing unit 6, serving as the fixing unit. The fixing unit 6 includes a fixing roller 61, equipped with a heat source such as a halogen heater inside, and a pressing roller 62, and the fixing roller 61 and the pressing roller 62 form a fixing nip portion. By passing the recording material S, to which the toner image has been transferred, through this fixing nip portion of the fixing unit 6, the recording material S is heated and pressed. Then, the toner on the recording material S is melted and mixed, and fixed on the recording material S as the full color image. Thereafter, the recording material S is discharged to a sheet discharge tray 102 by a sheet discharge roller 101. Herewith, a sequence of the image forming process is completed.

To be noted, the image forming apparatus 100 of the present embodiment is also capable of forming monochromic or multi color images using desired monochromic or some of four colors of the image forming units.

Developing Apparatus

Next, using FIGS. 3 and 4, a basic configuration of the developing apparatus 4 will be described. The developing apparatus 4 includes a developing container 41 accommodating the developer containing a nonmagnetic toner and a magnetic carrier, and a developing sleeve 44, serving as a developer bearing member, rotating with bearing the developer in the developing container. A first conveyance screw 43*a* and a second conveyance screw 43*b*, respectively serving as a first conveyance member and a second conveyance member, circulating the developer inside the developer container with agitating and conveying the developer are disposed inside the developing container 41. Further, a magnet roll 44*a*, serving as a magnetic field generation unit including a plurality of magnetic poles lined in a rotational direction, is disposed inside the developing sleeve 44 in a non-rotatable manner. Further, a developing blade 42, serving as a regulation member, forming a thin layer of the developer on a surface of the developing sleeve 44 is disposed.

The developing container 41 includes a developing case portion 41*j* accommodating the developer and an upper lid 41*k*, serving as a cover member covering an upper portion of the developing case portion 41*j*. The developing case portion 41*j* is a separate body from the upper lid 41*k*, and the developing container 41 is formed by disposing the upper lid 41*k* on the developing case portion 41*j*. The inside of the developing container 41 is separated into a developing chamber 41*a* (a first chamber) and an agitating chamber 41*b* (a second chamber) by a partition wall 41*c*, whose approximate center portion extends in a direction perpendicular to a paper surface, in such a manner that the inside of the developing container 41 is separated into right and left sides in a horizontal direction, and the developer is accommodated in the developing chamber 41*a* and the agitating chamber 41*b*. That is, the developing container 41 is constituted by a first case portion (the developing case portion 41*j*) disposing the first and second conveyance screws 43*a* and 43*b* inside and accommodating the developer, and a second case portion (the upper lid 41*k*) fitted to the first case portion and covering a part of an outer circumferential surface of the developing sleeve 44.

The first and second conveyance screws 43*a* and 43*b* are respectively disposed in the developing chamber 41*a* and the agitating chamber 41*b*. That is, the first and second conveyance screws 43*a* and 43*b* are disposed in the developing case portion 41*j*, and upper directions of the first and second conveyance screws 43*a* and 43*b* are covered by the upper lid 41*k*. A first communicating portion 41*d* and a second communicating portion 41*e* allowing the developer to pass through between the developing chamber 41*a* and the agitating chamber 41*b* are disposed at both ends of the partition wall 41*c* in a longitudinal direction (both ends of the developing sleeve 44 in a rotational axis direction, on the left and right hands sides in FIG. 4).

The first and second conveyance screws 43*a* and 43*b* each are formed by disposing a helical blade, serving as a conveyance portion, around a shaft (rotational shaft). Further, in addition to the helical blade, an agitating rib 43*b*1 protruding toward a radial direction from the shaft and having a predetermined width in a conveyance direction of the developer is disposed at the second conveyance screws 43*b*. The agitating rib 43*b*1 agitates the developer along with rotation of the shaft.

The first conveyance screw 43*a*, serving as the first conveyance member, is disposed at the bottom portion of the developing chamber 41*a* along the rotational axis direction of the developing sleeve 44. Further, the first conveyance screw 43*a* conveys the developer in the developing chamber 41*a* along an axis direction in a first direction (in an arrow α direction in FIG. 4) by being rotatably driven by a motor, not shown, and supplies the developer to the developing sleeve 44. The developer borne by the developing sleeve 44 and consumed of the toner at a developing process is collected in the developing chamber 41*a*.

Further, the second conveyance screw 43*b*, serving as the second conveyance member, is disposed at the bottom portion of the agitating chamber 41*b* along the rotational axis direction of the developing sleeve 44. In the present embodiment, the first and second conveyance screws 43*a* and 43*b* are disposed approximately parallel to each other. The second conveyance screw 43*b* conveys the developer inside the agitating chamber 41*b* along an axis direction in a second direction (in an arrow β direction in FIG. 4) opposite the first direction. As described above, the developer is conveyed by the first and second conveyance screws 43*a* and 43*b*, and circulated inside the developing container 41 via the first and second communicating portions 41*d* and 41*e*.

At an upstream end in the conveyance direction of the second conveyance screw 43*b* of the agitating chamber 41*b*, that is, in the second direction, a developer replenishment port 46 for replenishing the developer containing the toner to the inside of the developing container 41 is disposed. The developer replenishment port 46 is connected to a developer container 8 (toner bottle in FIG. 1) accommodating the developer for the replenishment. The developer for the replenishment is supplied to the inside of the agitating chamber 41*b* directly from the developer container 8 or via a developer replenishment apparatus which once stores the developer accommodated in the developer container 8 inside and supplies the developer to the developing apparatus 4.

The replenishment of the toner from the developer container 8 is performed by an automatic toner replenisher control (hereinafter referred to as ATR control). In particular, in accordance with image coverage at the image formation and a detection result of a patch image density by an inductance sensor 45 and a patch image density sensor 103 (refer to FIG. 1), the developer is replenished to the developer replenishment port 46 by controlling a movement of the developer container 8 for the replenishment or the developer replenishment apparatus.

Figure 4:
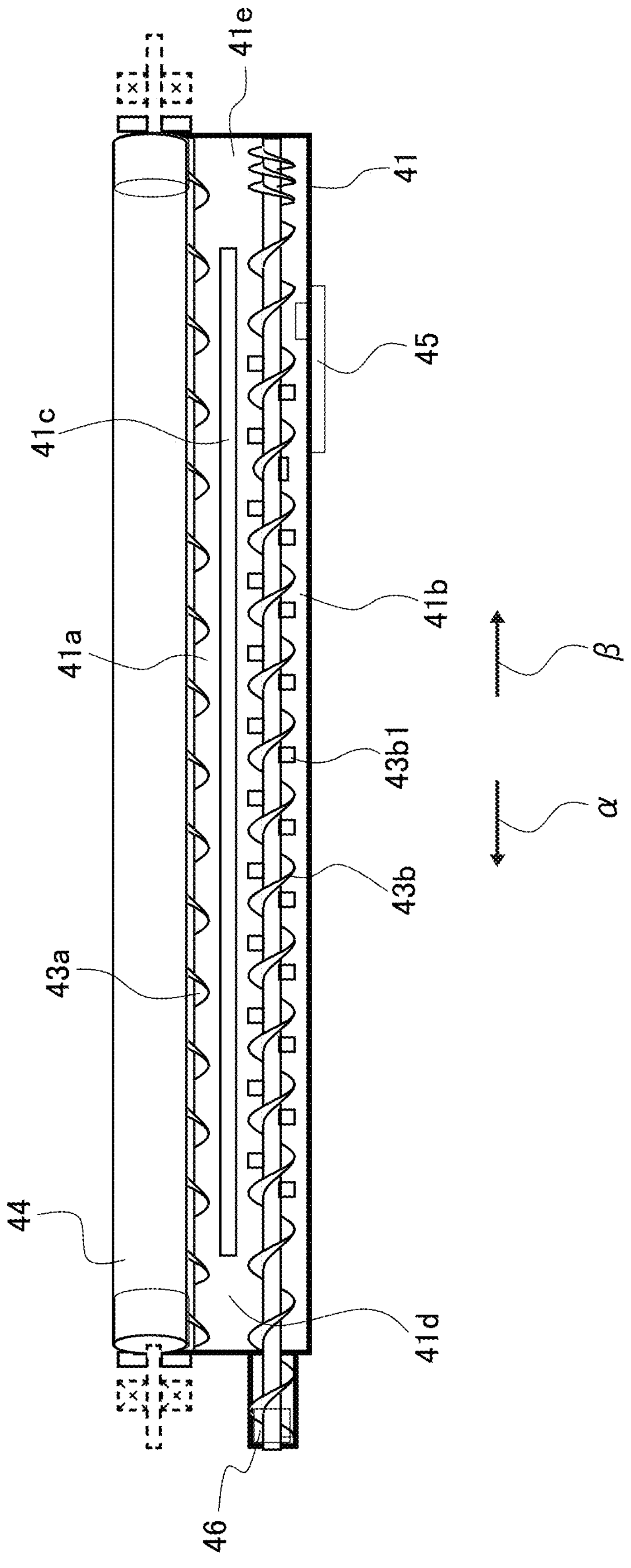
FIG. 4 is a schematic longitudinal cross-sectional view showing a configuration of the developing apparatus of the embodiment.

As shown in FIG. 4, the inductance sensor 45, serving as a toner density sensor, detecting the toner density inside the developing container 41 is disposed in the developing container 41. In the present embodiment, the inductance sensor 45 is disposed downstream of the agitating chamber 41*b* in the developer conveyance direction.

As shown in FIG. 1, the patch image density sensor 103 is disposed downstream of the image forming unit PK at a downstream end in a rotational direction of the intermediate transfer belt 51 and upstream of the secondary transfer portion T2, and facing a surface of the intermediate transfer belt 51. In the control using the patch image density sensor 103, for example, the toner image (patch image) for the control is transferred to the intermediate transfer belt 51 in a timing of a start of the image forming job, every image formation of predetermined number of sheets, and the like. Then, the patch image density sensor 103 detects the patch image density. Based on this detection result, the replenishment control of the developer from the developer container 8 is performed.

To be noted, a configuration to replenish the developer to the developing apparatus 4 is not limited to this, and it is acceptable to use a configuration hitherto known.

The second conveyance screw 43*b* conveys the developer replenished from the developer replenishment port 46 and the developer already existing in the agitating chamber 41*b* while agitating, and equalizes the toner density. By conveyance force of the first and second conveyance screws 43*a* and 43*b*, the developer, decreased in the toner density by consumption of the toner at the developing step, inside the developing chamber 41*a* is moved inside the agitating chamber 41*b* via the first communicating portion 41*d*, serving as one side of delivery portions (left hand side in FIG. 4). Then, the developer moved to the agitating chamber 41*b* is conveyed to the developing chamber 41*a*, while being agitated with the replenished developer, via the second communicating portion 41*e* (right hand side in FIG. 4), serving as the other side of the delivery portions.

In the developing chamber 41*a* of the developing container 41, an opening portion 41*h* is formed at a position corresponding to a facing area A (developing area) facing the photosensitive drum 1, and the developing sleeve 44 is rotatably disposed so as to be partly exposed to a direction of the photosensitive drum 1 in the opening portion 41*h*. On the other hand, the magnet roll 44*a* built-in in the developing sleeve 44 is fixed in a non-rotatable manner. The developing sleeve 44 as described above is capable of conveying the developer to the facing area A by being rotatably driven by a motor, not shown, and supplies the developer in the facing area A to the photosensitive drum 1. That is, the facing area A (developing area) is an area in which a magnetic brush formed by a carrier, magnetized by the magnet roll 44*a*, on the developing sleeve 44 comes into contact with the electrostatic latent image formed on the photosensitive drum 1. In the present embodiment, the developing sleeve 44 is formed in a cylindrical shape by using nonmagnetic material such as aluminum and stainless steel. Further, the developing sleeve 44 rotates from a lower side toward an upper side in the gravity direction in the facing area A, that is, in a counter-clockwise direction (arrow γ direction) in FIG. 3. Further, the photosensitive drum 1 rotates in the same direction (arrow δ direction) as the developing sleeve 44 in the facing area A.

The developing blade 42 serving as the regulation member to regulate a quantity (layer thickness) of the developer borne by the developing sleeve 44 is fixed on an upstream side of the opening portion 41*h* in a rotational direction of the developing sleeve 44. In the present embodiment, since the developing sleeve 44 rotates from the lower side toward the upper side in the gravity direction in the facing area A, the developing blade 42 is positioned on the lower side of the facing area A in the gravity direction.

Figure 3:
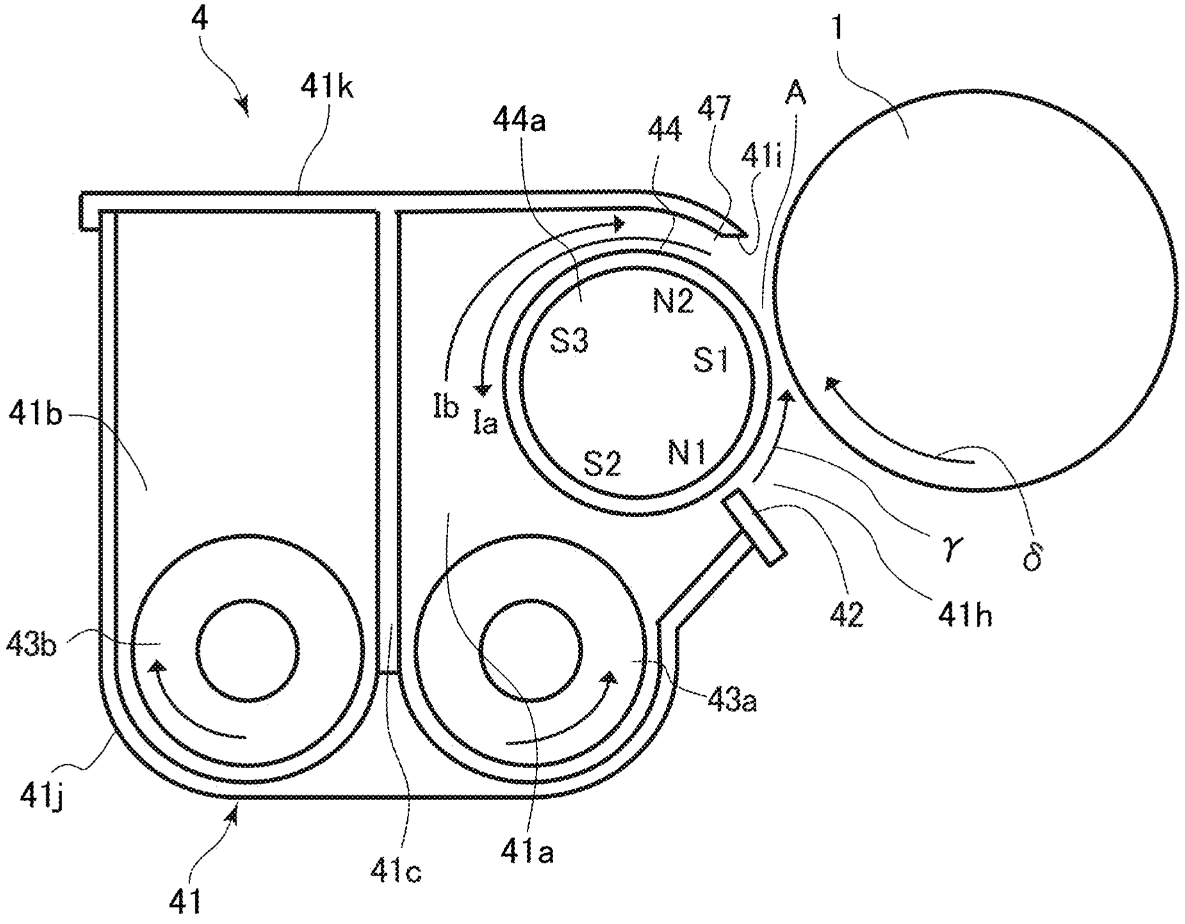
FIG. 3 is a schematic lateral cross-sectional view showing a basic configuration of a developing apparatus of the embodiment.

As shown in FIG. 3, the magnet roll 44*a* includes a total of five poles of a plurality of magnetic poles S1, S2, S3, N1, and N2 in a circumferential direction, and is formed in a roller shape. The magnet roll 44*a* as described above generates a magnetic field for the developing sleeve 44 to bear the developer, and also generates the magnetic field to peel the developer from the developing sleeve 44 in a peeling area, described later. That is, the developer in the developing chamber 41*a* is supplied from the developing chamber 41*a* to the developing sleeve 44. Then, a predetermined quantity of the developer supplied to the developing sleeve 44 is borne on the developing sleeve 44 (developer bearing member) by the magnetic field generated by an adsorption magnetic pole S2, and forms a retaining portion of the developer. That is, the adsorption magnetic pole S2 corresponds to a second magnetic pole by which the developer inside the developing container is borne on the developing sleeve 44.

The developer on the developing sleeve 44, having passed through the accumulating portion of the developer by rotation of the developing sleeve 44, naps at a regulation magnetic pole N1, and the layer thickness is regulated by the developing blade 42 facing the regulation magnetic pole N1. Then, the developer whose layer thickness has been regulated is conveyed to the facing area A facing the photosensitive drum 1, and forms the magnetic brush by napping at a developing magnetic pole S1. This magnetic brush comes into contact with the photosensitive drum 1 rotating in the same direction as the developing sleeve 44, and develops the electrostatic latent image into the toner image with the charged toner. That is, the developing magnetic pole S1 corresponds to a first magnetic pole disposed at a position where the developing sleeve 44 comes closest to the photosensitive drum 1.

Thereafter, the developer, decreased in the toner density by the consumption of the toner, on the developing sleeve 44 is conveyed inside the developing container 41 by the rotation of the developing sleeve 44 while the adsorption of the developer to a surface of the developing sleeve 44 is being maintained by a conveyance magnetic pole N2. Then, the developer borne on the developing sleeve 44 is peeled from the surface of the developing sleeve 44 in the peeling area formed by a peeling magnetic pole S3 and the adsorption magnetic pole S2, both having the same polarity and disposed in a sequence in the rotational direction of the developing sleeve 44. The peeled developer is collected in the developing chamber 41*a* of the developing container 41. That is, the peeling magnetic pole S3 corresponds to a third magnetic pole disposed adjoiningly upstream of the adsorption magnetic pole S2, serving as the second magnetic pole, in the rotational direction of the developing sleeve 44.

Scattering of Developer

At this point, scattering of the developer generated from the developing apparatus will be described. First, regarding the image forming apparatus, along with demands for acceleration and image quality enhancement of an output image, simplification of maintenance is also requested. Reduction of soiling of an inside of the image forming apparatus by the developer is pointed out to be as one of this maintenance simplification. If the inside of the image forming apparatus is soiled by the developer, image defects such as the soiling of the output image occurs, and a cleaning work is required at the replacement of the developing apparatus and the photosensitive drum unit. Further, in a case where the developer sticks to each drive system such as a gear, there is a risk that generates a slide and the like in the drive system.

The scattering of the developer from an inside of the developing unit is pointed out to be one cause of the soiling of the inside of the image forming apparatus by the developer described above. For example, in a case of a two-component developer, since the toner and the carrier are normally frictionally charged inside the developing unit, the toner and the carrier are adhered to each other by electrostatic force. However, there is a risk of an occurrence of the scattering of the developer in a case where this adhering is released by some sort of an impact so that the toner released from the carrier is discharged along with an air flow from the inside of the developing unit.

As a representative path of the scattering of the toner from the inside of the developing unit, an intake port 47 (refer to FIG. 3) disposed between the developing container 41 and the developing sleeve 44 and taking the developer on the developing sleeve 44 into the developing container 41 by the rotation of the developing sleeve 44 is pointed out. The intake port 47 (inflow path) is a gap between an opening edge 41*i*, which is one of both edges of the opening portion 41*h* and downstream of the developing area A in the rotational direction of the developing sleeve 44, and the developing sleeve 44. On the other hand, the developing blade 42 faces the developing sleeve 44 adjoiningly on an opposite side (lower side in FIG. 3) of the intake port 47. Therefore, since, at this position, the layer thickness of the developer borne on the developing sleeve 44 is in a state regulated by the developing blade 42, it is difficult for air to flow out through a gap between the developing sleeve 44 and the developing blade 42. Accordingly, the scattering of the toner outside the developing container mainly occurs at the intake port 47.

First, an outline of the scattering of the toner from the intake port 47 will be described using FIGS. 5 and 6 with reference to FIG. 3. The scattering of the toner here means that the released toner generated inside the developing container 41 by the agitation and the conveyance of the developer and the replenishment of the toner is discharged outside the developing container 41 through the intake port 47 and is not fully collected in the developing container 41.

Release of the toner will be described. The toner and the carrier accommodated in the developing container 41 are frictionally charged in the agitating chamber 41*b* and the developing chamber 41*a*, are adhered to each other by electrostatic adhering force generated by the frictional charging and non-electrostatic adhering force generated by intermolecular force and the like. If the impact and shearing force is applied to this toner adhered to the carrier, the toner is peeled from the carrier by inertial force and the like and released inside the developing container 41. Behavior of the developer in the conveyance of the developer by the developing sleeve 44 causes the impact and shearing force of this time.

Figure 5:
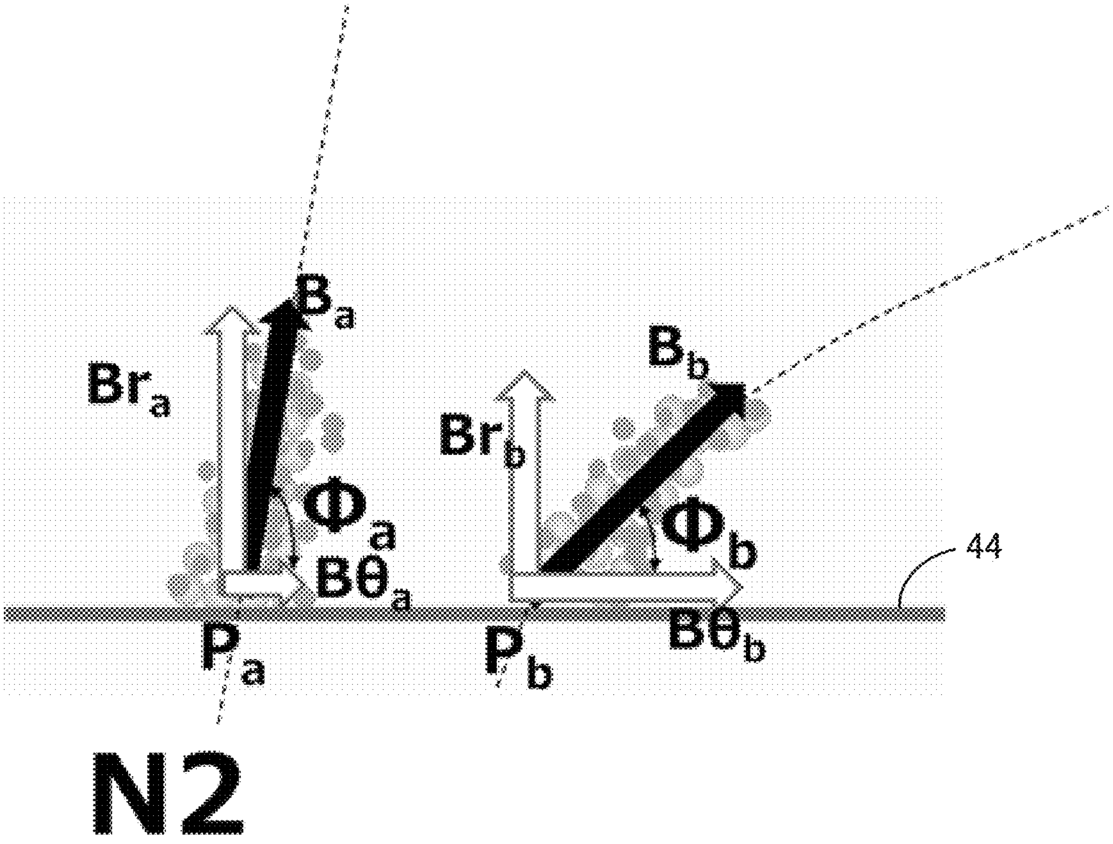
FIG. 5 is a schematic view showing a relationship between a magnetic flux density and a magnetic brush angle on a developing sleeve.
Figure 6:
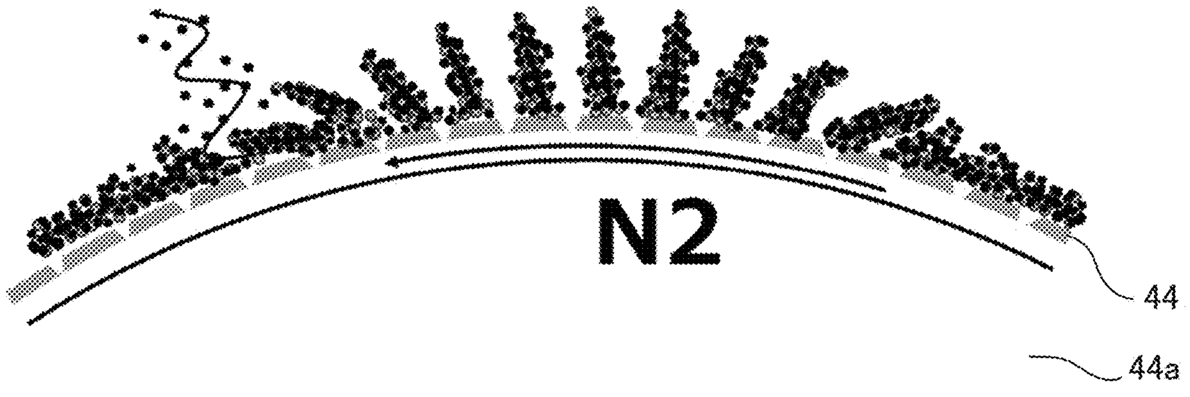
FIG. 6 is a schematic view showing a behavior of the magnetic brush on the developing sleeve around an N2 pole.

As shown in FIG. 5, the developer forms the magnetic brush, having a chain shaped configuration along a line of magnetic force of internal magnetic poles, on the developing sleeve 44. That is, the developer forms the magnetic brush on each of the magnetic poles of the developing sleeve 44, and each of the magnetic brushes has the chain shaped configuration along an angle $\varphi$ of a magnetic flux density B (line of magnetic flux) passing through each of the magnetic poles. The angle $\varphi$ of the line of the magnetic flux is determined by largeness Br of a normal component of the magnetic flux density B and largeness B$\theta$ of a tangential component of the magnetic flux density B. The angle $\varphi$ of the magnetic flux density (line of a magnetic flux) is an angle between the magnetic flux density and a tangential line of the developing sleeve 44.

Accordingly, since, at a point Pa which is in adjacent to the magnetic pole N2, the largeness Bra of the magnetic flux density in the normal direction is large and the largeness B$\theta$a in the tangential direction is small, the angle $\varphi$a of the magnetic flux density B (line of the magnetic flux) comes close to 90 degree (normal direction). On the other hand, since, at a point Pb which is apart from the magnetic pole N2, in comparison with the point Pa, the largeness Brb of the magnetic flux density in the normal direction becomes smaller and the largeness B$\theta$b in the tangential direction becomes larger, the angle $\varphi$b between the magnetic flux density Bb (line of the magnetic flux) and the tangential line of the developing sleeve 44 becomes smaller. Accordingly, as shown in FIG. 6, by the magnetic flux density B formed by the magnetic poles of the magnet roll 44*a*, the magnetic brush rises up before passing through the magnetic poles, and comes down after having passed through the magnetic poles. That is, by the rotation of the developing sleeve 44, the magnetic brush rises in a forward direction of the rotational direction immediately before passing through the magnetic poles, and comes down in a forward direction of the rotational direction after having passed through the magnetic poles. At this time, a rotational direction of the magnetic brush is the same direction as the rotational direction of the developing sleeve 44. In particular, peeling of the toner from the carrier by the impact and the inertia force at this coming down of the magnetic brush causes the release of the toner.

Further, a magnetic pole which largely contributes to the release of the toner at the conveyance of the developer by the developing sleeve 44 is the peeling magnetic pole S3 (peeling pole) generating a repulsive magnetic field with the adsorption magnetic pole S2. So as to peel the developer from the developing sleeve 44, this peeling magnetic pole S3 applies magnetic force in a direction opposite the rotational direction of the developing sleeve 44, and decreases the conveyance speed of the developer so as to retain the developer. At this time, since a flow rate of the developer being conveyed on the surface of the developing sleeve 44 is sustained, a length of the magnetic brush is lengthened along the line of the magnetic flux. If the magnetic brush is lengthened, the impact and the inertia force at the coming down of the magnetic brush become larger, and a quantity of the released toner tends to increase.

Next, the air flow inside and in adjacent to the developing apparatus 4 will be described. In adjacent to the developing apparatus 4, the developing sleeve 44 and the photosensitive drum 1 generate the air flow. Each will be separately described herein. At first, by the rotation of the developing sleeve 44 and the behavior of the magnetic brush on the magnetic pole, the air flow is generated in approximately the same direction as the rotational direction of the developing sleeve 44. This air flow generated in approximately the same direction as the rotational direction of the developing sleeve 44 takes in the air into the inside of the developing container 41 from the intake port 47 which is a communicating port connecting the inside and the outside of the developing container 41.

Assuming that the developing container 41 is approximately a closed space, since the air is a fluid, it is possible to apply a continuity equation. When a flow velocity and a density of the air are respectively treated as v and $\rho$, the next formula (1) holds true.

[Formula 1]

$$\partial\rho/\partial t+\nabla\rho v=0 \tag{1}$$

Further, when a steady state is considered, since internal pressure is stabilized at constant pressure in a state higher than atmospheric pressure, it is possible to consider that there is not a time change in the density $\rho$ in each area inside the developing container 41, and possible to describe the formula 1 by the next formula (2).

[Formula 2]

$$\rho\nabla v=0 \tag{2}$$

From this formula (2), the flow rate of the air is sustained. Since, in adjacent to the developing apparatus 4, balance of the flow rate $\rho$v becomes zero in a cross section taken along a longitudinal direction (the rotational axis direction of the developing sleeve 44), the same quantity of the air as a quantity of the air flowed in by the developing sleeve 44 and the replenishment is discharged outside the developing apparatus 4. At this point, the flow rate of the air flowed into the inside of the developing container 41 through the intake port 47, formed by the upper lid 41*k* and the developing sleeve 44 of the developing container 41, along with the rotation of the developing sleeve 44 is treated as Ia (sleeve inflow). Further, the air flow discharged from the intake port 47 passes through the upper lid 41*k* in a manner facing the air flow taken in from the intake port 47. The flow rate of the air discharged as described above is treated as Ib (sleeve discharge). In addition, the flow rate of the air discharged from a gap, an edge, and the like of the developing container 41 is treated as Ic (the other leak), then a relationship of the next formula is satisfied.

[Formula 3]

$$Ia(\text{sleeve inflow})=Ib(\text{sleeve discharge})+Ic(\text{the other leak}) \quad (3)$$

The air flow taken in by the developing sleeve 44 and flowing along the developing sleeve 44 is discharged by being turned back inside the developing container 41. The scattering of the toner occurs in such a manner that the released toner described above is caught in the air flow turned back inside the developing unit and brought out outside the developing unit. In particular, when approximately the same quantity of the air as a quantity of the air taken in into the developing unit 4 by the rotation of the developing sleeve 44 is discharged outside the developing unit, the air inside the developing unit 4 passes through a vicinity of the peeling magnetic pole S3. Therefore, if there is not a discharge port capable of adequately discharging the inside air of the developing container, approximately the same quantity of the air taken in from the intake port 47, between the developing sleeve 44 and the upper lid 41*k*, to the inside of the developing apparatus 4 is discharged. That is, the scattering of the toner occurs in such a manner that the air flow discharged from the inside of the developing apparatus 4 catches the air with a high released toner density in adjacent to the peeling magnetic pole S3 and is discharged from the intake port 47 between the developing sleeve 44 and the upper lid 41*k*.

Measure Coping with Scattering of Toner

Figure 7:
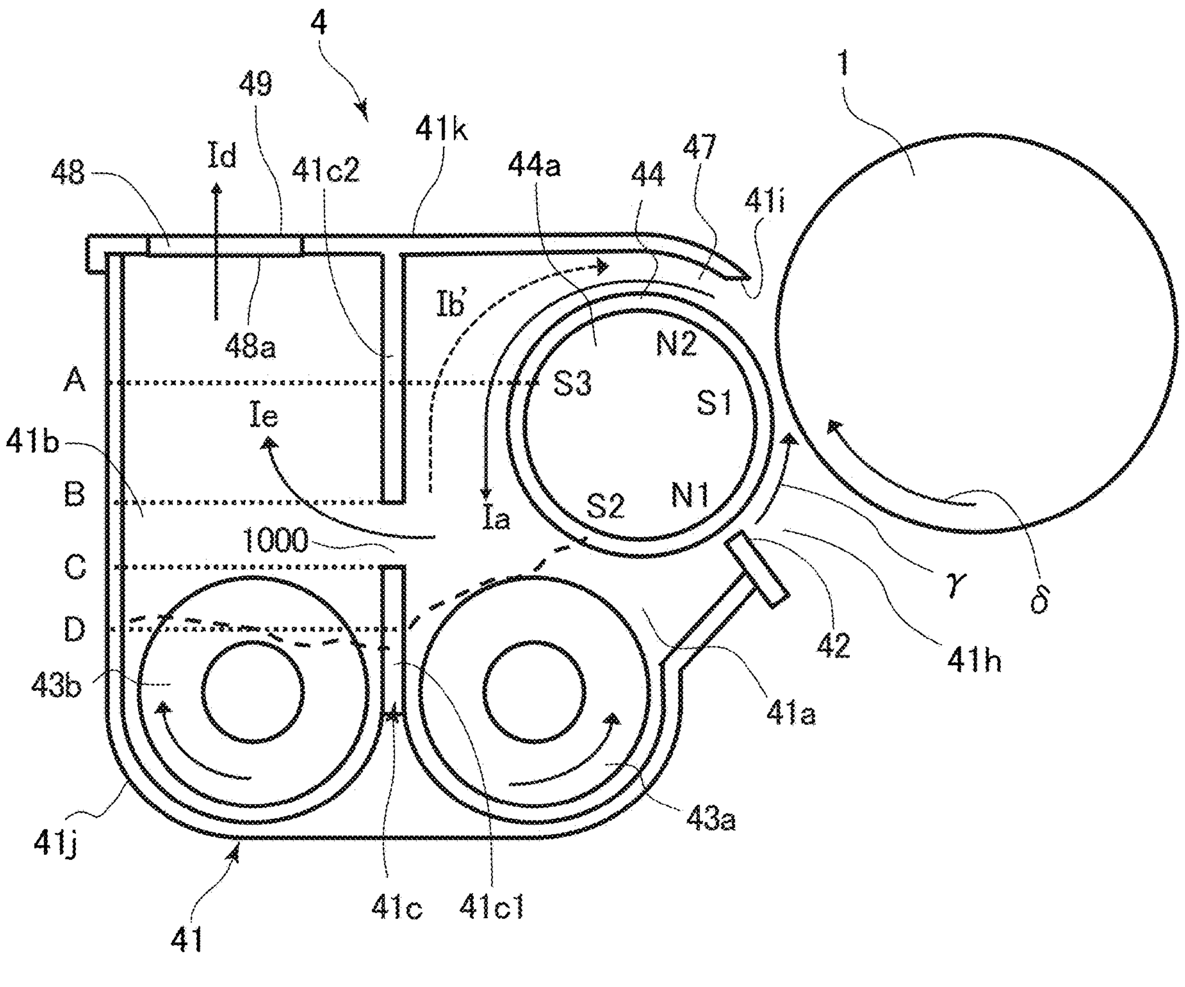
FIG. 7 is a schematic cross-sectional view showing discharge paths of air flows in the developing apparatus of the embodiment.
Figure 8:
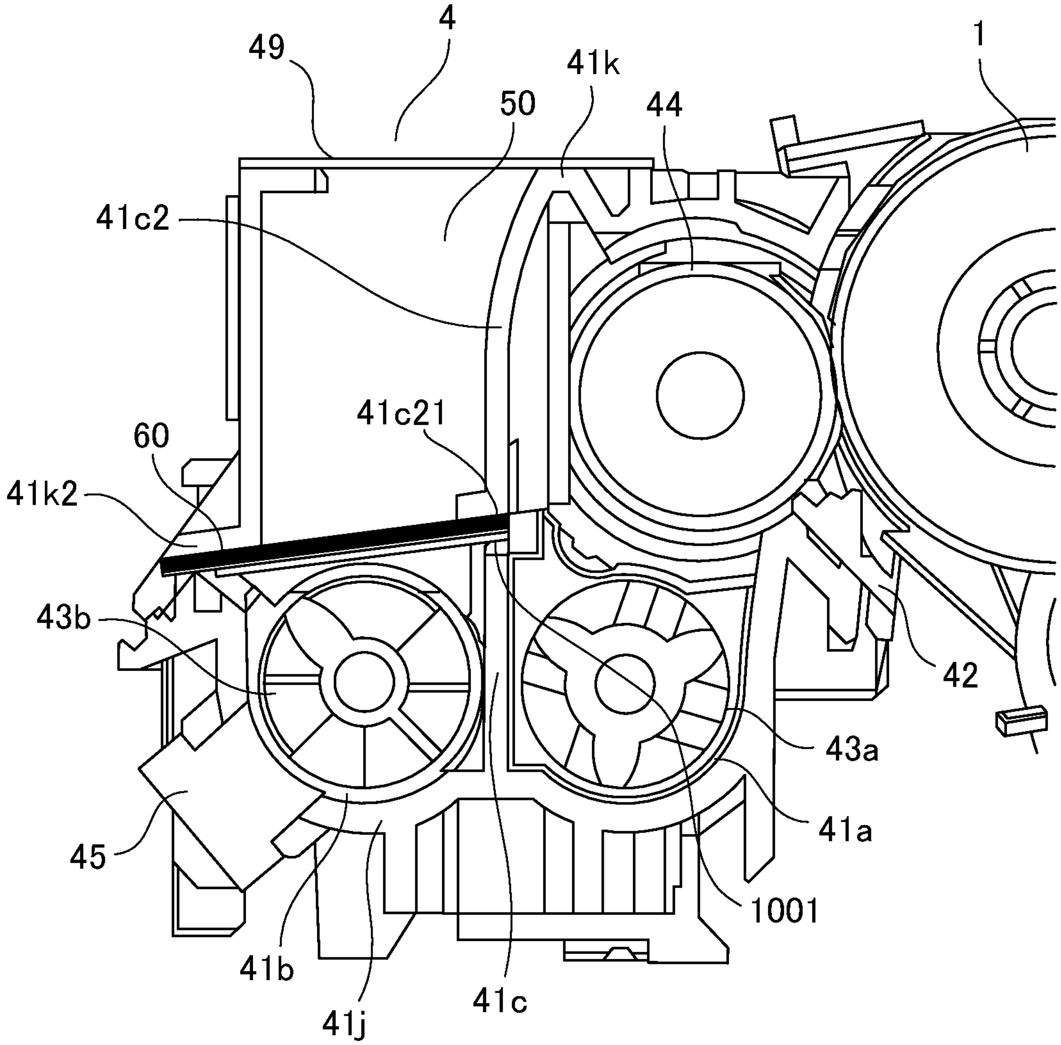
FIG. 8 is a cross-sectional view showing the developing apparatus of the embodiment.
Figure 9:
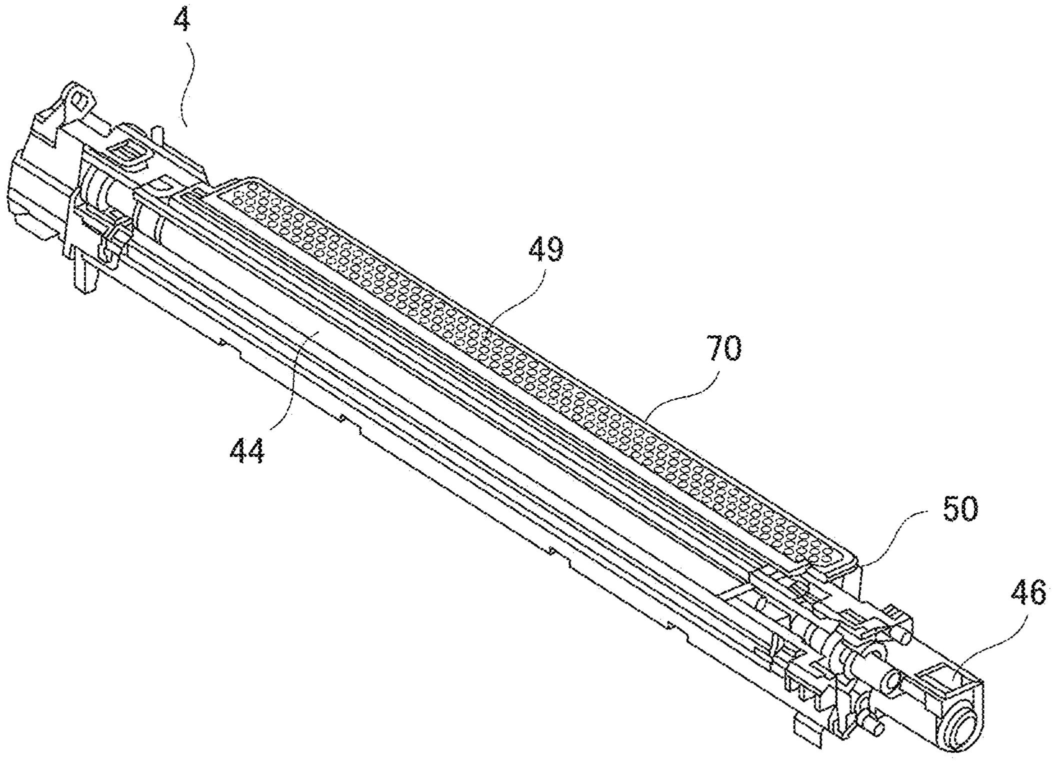
FIG. 9 is a perspective view showing the developing apparatus of the embodiment when obliquely viewed from above.
Figure 10:
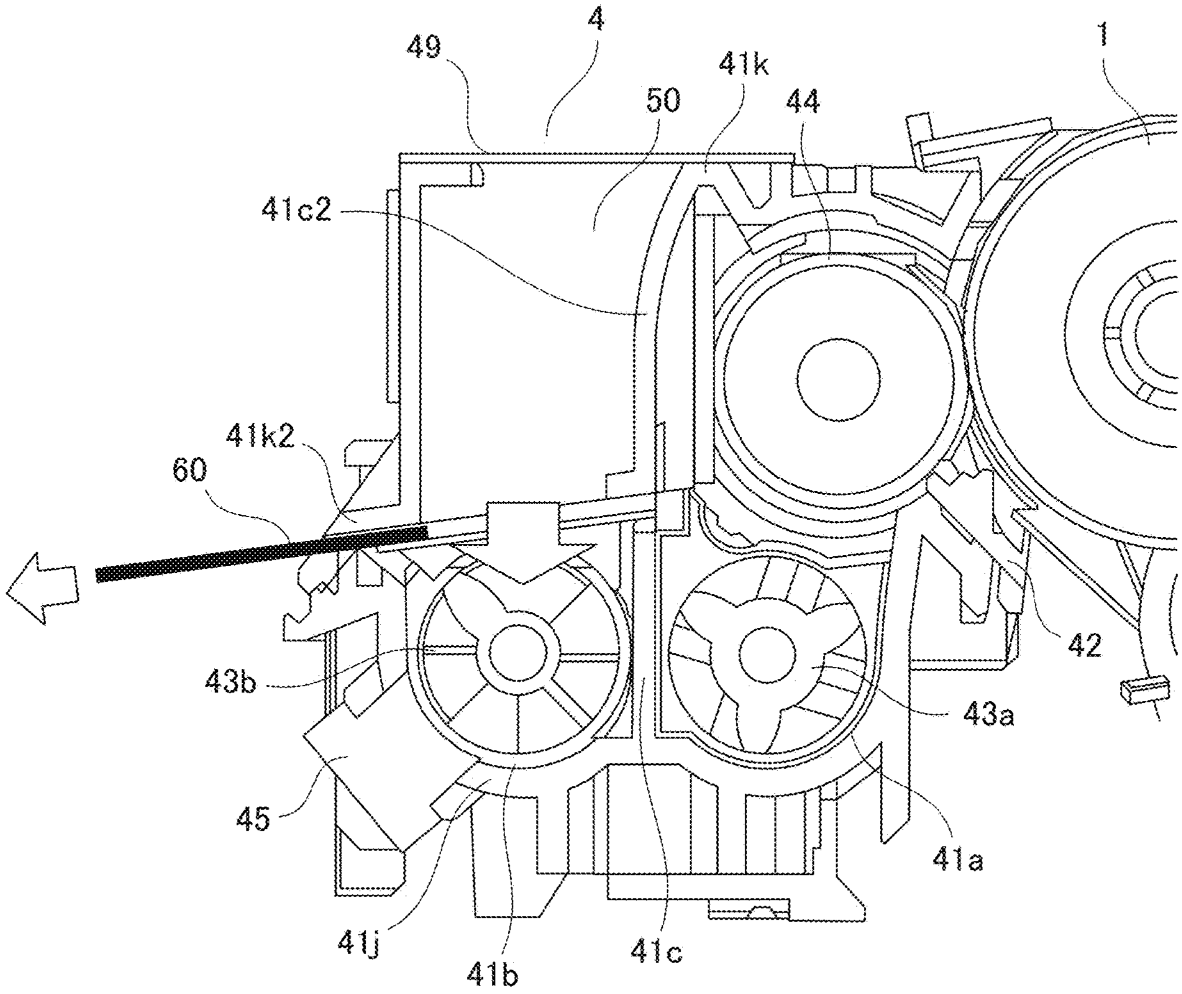
FIG. 10 is a diagram showing a method to remove an initial developer sealing sheet from the developing apparatus of the embodiment.

Next, a measure coping with the scattering of the toner in the present embodiment will be described. In the present embodiment, so as to reduce the scattering of the toner, the air flow Ib passing through the intake port 47 between the developing sleeve 44 and the upper lid 41*k* via the vicinity of the peeling magnetic pole S3 is reduced. Using FIG. 7, a configuration of the developing apparatus 4 which reduces the air flow Ib will be described. Further, using FIGS. 8, 9, and 10, the configuration of the developing apparatus 4 of the present embodiment will be described in detail. FIG. 8 is a cross-sectional view showing the developing apparatus 4 of the present embodiment. FIG. 9 is a perspective view showing the developing apparatus of the present embodiment when obliquely viewed from above. FIG. 10 is a diagram showing a method of removing an initial developer sealing sheet from the developing apparatus of the present embodiment.

The agitating chamber 41*b* is communicated with the outside by a discharge port 48 formed in the developing container 41, and the discharge port 48 is capable of discharging the air inside the developing container 41. The discharge port 48 is formed in the upper direction of a third communicating portion 1000, described later, and, further, in the upper direction of the developing sleeve 44. In particular, in the present embodiment, the discharge port 48 is formed in the upper lid 41*k* (in the upper direction of the agitating chamber 41*b*), and is opening to the upward direction of the developing apparatus 4. An air filter 49, serving as a catching member, made of unwoven fabric, allowing a passage of the air, and catching the toner is disposed in the discharge port 48. That is, an opening portion of the discharge port 48 is covered by the air filter 49, and ventilates the developing apparatus 4 with the outside.

The discharge port 48 is formed over approximately a whole area in a longitudinal direction of the developing container 41 (a rotational axis direction of the developing sleeve 44), and is capable of discharging the air inside the developing container 41 over approximately the whole area in the longitudinal direction of the developing container 41.

The third communicating portion 1000 connecting the developing chamber 41*a* with the agitating chamber 41*b* is formed in the partition wall 41*c* separately from the first and second communicating portions 41*d* and 41*e*, and allows the air inside the developing container 41 to move between the developing chamber 41*a* and the agitating chamber 41*b*. All of the first, second, and third communicating portions 41*d*, 41*e*, and 1000 are opening portions formed to connect the developing chamber 41*a* with the agitating chamber 41*b*. However, although the first and second communicating portions 41*d* and 41*e* are formed in positions where the developer is passable, the third communicating portion 1000 is formed in the upper direction of the first and second communicating portions 41*d* and 41*e*. Further, the third communicating portion 1000 is formed over approximately the whole area in the longitudinal direction of the developing container 41 (the rotational axis direction of the developing sleeve 44), and connects the developing chamber 41*a* with the agitating chamber 41*b* over approximately the whole area in the longitudinal direction. Since the third communicating portion 1000 connects the developing chamber 41*a* with the agitating chamber 41*b* over approximately the whole area in the longitudinal direction, in comparison with cases connecting partially or locally, it is possible to ensure that an adequate quantity of the air inside the developing container 41 moves between the developing chamber 41*a* and the agitating chamber 41*b*.

To be noted, in the present embodiment, if any of the conditions described below is fulfilled, it is regarded that the third communicating portion 1000 is formed over approximately the whole area in the longitudinal direction of the developing container 41. For example, if the third communicating portion 1000 is formed across an area equal to or more than 90% of an area between a downstream end of the first communicating portion 41*d* and an upstream end of the second communicating portion 41*e* in the conveyance direction of the second conveyance screw 43*b*, it is regarded that the third communicating portion 1000 is formed over approximately the whole area. Further, for example, if the third communicating portion 1000 is formed across an area equal to or more than 90% of an area where the developing sleeve 44 is capable of conveying the developer (area capable of performing the image formation), it is regarded that the third communicating portion 1000 is formed over approximately the whole area in the longitudinal direction of the developing container 41. The area where the developing sleeve 44 is capable of conveying the developer, is, for example, an area in which, on an outer surface of the developing sleeve 44, groove portions are cyclically formed at intervals along a circumferential direction of the developing sleeve 44.

That is, it is acceptable if a part of the third communicating portion 1000 is covered by a filter or blocked by a film and a sponge, and it is acceptable if the third communicating portion 1000 is formed over equal to or more than 90% of the area described above in a state covered by the filter or blocked by the film and the sponge. Similarly, if the third communicating portion 1000 is formed discontinuously by disposing a rib locally in the area described above, it is acceptable if the third communicating portion 1000 is formed over equal to or more than 90% of the area described above in a state disposing the rib locally in the area described above. Further, if the discharge port 48 is formed discontinuously by disposing the rib locally in the area described above, it is acceptable if the discharge port 48 is formed over equal to or more than 90% of the area described above in the state disposing the rib locally in the area described above.

Further, the third communicating portion 1000 is opening to a lower direction of a position where magnitude of a normal direction component of a magnetic field of the peeling magnetic pole S3 becomes the maximum on a surface of the developing sleeve 44, and to an upper direction of a surface of the developer accommodated in the developing container 41 (surface of the developer of the developing apparatus 4 in the steady state). To be noted, by idling the developing apparatus 4 for two minutes from a stopping state of the developing apparatus 4, a height of the surface of the developer in the developing apparatus 4 becomes the steady state.

The position where the magnitude of the normal direction component of the magnetic field of the peeling magnetic pole S3 becomes the maximum on the surface of the developing sleeve 44 is hereinafter referred to as a maximum peak position. In FIG. 7, the third communicating portion 1000 is formed between A, indicating a height of the maximum peak position of the peeling magnetic pole S3, and D, indicating a height of the surface of the developer. To be noted, the height of the surface of the developer here is the maximum height of the surface of the developer coming into contact with the partition wall 41*c* in a case where the first and second conveyance screws 43*a* and 43*b* are rotating during the image formation. Further, the third communicating portion 1000 is formed in a rectangular shape which is long along the longitudinal direction of the developing container 41 (the rotational axis direction of the developing sleeve 44).

At this point, the partition wall 41*c* is constituted by a first wall portion 41*c*1 formed on the developing case portion 41*j* and a second wall portion 41*c*2 formed on the upper lid 41*k*. Further, the third communicating portion 1000 is formed between the first wall portion 41*c*1 and the second wall portion 41*c*2. That is, the second wall portion 41*c*2 is formed in a manner projecting toward a lower direction of the upper lid 41*k*, and separates the developing chamber 41*a* and the agitating chamber 41*b* from each other in the upper direction of the first and second conveyance screws 43*a* and 43*b*. On the other hand, the first wall portion 41*c*1 is disposed between the first and second conveyance screws 43*a* and 43*b* in the developing case portion 41*j*, and separates the developing chamber 41*a* and the agitating chamber 41*b* from each other in an area in which the developer is present. Further, the first and second communicating portions 41*d* and 41*e* are formed in the first wall portion 41*c*1. Then, the third communicating portion 1000 is formed between edges of the first and second wall portions 41*c*1 and 41*c*2.

Further, in a case of the present embodiment, in an unused state of the developing apparatus 4 (at the time of shipment of the developing apparatus 4), initial developer is enclosed in a space (upper space of the agitating chamber 41*b*, an initial developer accommodating chamber 50) in the upper direction of the second conveyance screw 43*b* inside the agitating chamber 41*b*. Further, in the case of the present embodiment, the initial developer accommodating chamber 50 is disposed on a side of the upper lid 41*k* out of the developing case portion 41*j*, accommodating the developer, and the upper lid 41*k*, serving as the cover member, covering the upper part of the developing case portion 41*j*.

By shipping the developing apparatus 4 with the initial developer enclosed in the initial developer accommodating chamber 50, it is possible to suppress staining of the developing apparatus 4 before starting a use due to a leak of the developer outside from a gap of the developing apparatus 4 and the like during a distribution period before starting the use.

So as to enclose the initial developer, for example, an edge portion opposite the second wall portion 41*c*2 of the upper lid 41*k* is extended toward a side of the developing case portion 41*j*, and the initial developer is enclosed in a space (initial developer accommodating chamber 50) between this extended portion (extended portion 41*k*2) and the second wall portion 41*c*2. At this time, each of the second wall portion 41*c*2 of the upper lid 41*k* and the extended portion 41*k*2 is used as a sticking portion of a sheet (initial developer sealing sheet 60) for sealing the initial developer in the initial developer accommodating chamber 50. Although, in the present embodiment, a PET (polyethylene) sheet with a thickness of 0.5 mm is used for the initial developer sealing sheet 60, it is not particularly limited to this material and shape.

Further, the upper lid 41*k* is assembled to the developing case portion 41*j* with an opening of this space (initial developer accommodating chamber 50) on a side of the developing case portion 41*j* sealed by the initial developer sealing sheet 60 and the like. Herewith, the developing apparatus 4 with the initial developer sealed in the space (initial developer accommodating chamber 50) in the upper direction of the second conveyance screw 43*b* is obtained. Then, before starting the use of the developing apparatus 4 in this unused state after installing in the image forming apparatus, the initial developer sealing sheet 60 is slid in a backward direction of the developing apparatus 4 as shown in FIG. 10. Then, by removing the initial developer sealing sheet 60 in a pulling out manner as shown in FIG. 10, the enclosed initial developer is dropped to a lower portion of the agitating chamber 41*b*. Thereafter, by driving the first and second conveyance screws 43*a* and 43*b*, the developer is spread over the developing chamber 41*a* and the agitating chamber 41*b*.

Since, as shown in FIG. 9, the air filter 49 made of unwoven fabric is disposed above the initial developer accommodating chamber 50 as described above, it is possible to ventilate the developing apparatus 4 with the outside. As shown in FIG. 10, after the initial developer has been dropped to the agitating chamber 41*b* by removing the initial developer sealing sheet 60, the agitating chamber 41*b* and the initial developer accommodating chamber 50 are communicated with each other. Therefore, the air inside the agitating chamber 41*b* is able to move to the emptied initial developer accommodating chamber 50 and flow outside the developing apparatus 4 through the air filter 49. Since it is possible to suppress an increase in the internal pressure inside the developing apparatus 4 by such a configuration, it is possible to suppress the scattering of the toner through the gap of the developing apparatus 4 such as the gap between the developing sleeve 44 and the developing container 41 in the upper direction of the developing sleeve 44.

In addition, as shown in FIG. 9, a filter cover 70 made of the PET sheet with a thickness of 0.1 mm is further disposed above the air filter 49 in a manner overlapping each other. A plurality of holes (hole diameter: 5 mm) are disposed in the filter cover 70 so as not to hamper the air from flowing from the inside of the developing apparatus 4 to the outside of the developing apparatus 4 via the air filter 49. Further, the filter cover 70 is disposed above the air filter 49 in a vertical direction in such a manner that the filter cover 70 overlaps with the air filter 49 for covering the filter cover 70.

Herewith, if a worker (service person) touches the filter cover 70 with a hand, damage to the air filter 49 does not occur.

As described above, since the initial developer is enclosed in the upper part (initial developer accommodating chamber 50) of the agitating chamber 41*b* in the present embodiment, it is possible to enclose the initial developer without sealing the third communication portion 1000, and, further, the first and second communicating portions 41*d* and 41*e* with a sheet and the like. To be noted, it is acceptable to enclose the initial developer in the agitating chamber 41*b*, which includes a space where the second conveyance screw 43*b* is disposed, by sealing the first, second, and third communicating portions 41*d*, 41*e*, and 1000 with the sheet.

Such a configuration of the developing apparatus 4 of the present embodiment will be more specifically described using FIG. 7. First, a width in the vertical direction of the opening of the third communicating portion 1000 disposed in the partition wall 41*c*, separating the developing chamber 41*a* and the agitating chamber 41*b* from each other, and connecting the developing chamber 41*a* and the agitating chamber 41*b* with each other over the whole area in the longitudinal direction will be described. The height of the maximum peak position of the peeling magnetic pole S3 in the vertical direction, a height of an upper side opening edge of the third communicating portion 1000 in the vertical direction, and a lower side opening edge of the third communicating portion 1000 in the vertical direction are respectively treated as A, B, and C. Further, a height of a higher contact point between contact points of surfaces of the developer circulating in the developing chamber 41*a* and the developer circulating in the agitating chamber 41*b* (surface of the developer of the developing apparatus 4 at the steady state) with the partition wall 41*c* is treated as D. At this time, the width of the opening of the third communicating portion 1000 is configured so as to satisfy the relationship shown in a formula (4) below.

[Formula 4]

$$A>B>C>D \quad (4)$$

That is, the width of the opening of the third communicating portion 1000 in the vertical direction is set so that the opening of the third communicating portion 1000 is in the lower direction of the maximum peak position A of the peeling magnetic pole S3 and in the upper direction of the height D of the surface of the developer of the developing apparatus 4 at the steady state. By disposing the third communicating portion 1000 in the lower direction of the maximum peak position of the peeling magnetic pole S3, it becomes easy for the air flow Ia, with the high toner density, in which the released toner generated at the peeling magnetic pole S3 is mixed to flow to the agitating chamber 41*b* through the third communicating portion 1000. Further, by disposing the third communicating portion 1000 in the upper direction of the surface of the developer circulating in the developing chamber 41*a* and the developer circulating in the agitating chamber 41*b* (the surface of the developer of the developing apparatus 4 at the steady state), it is possible to prevent the developer of the developing chamber 41*a* and the agitating chamber 41*b* from circulating via the third communicating portion 1000 by communicating with each other.

The discharge port 48 is formed by disposing an opening in the upper lid 41*k* (initial developer accommodating chamber 50) disposed above the agitating chamber 41*b* the vertical direction. That is, in the unused state of the developing apparatus 4, an opening of the initial developer accommodating chamber 50 on the side of the developing case portion 41*j* is sealed with the initial developer sealing sheet 60, and the initial developer is enclosed in the initial developer accommodating chamber 50. Further, in the unused state of the developing apparatus 4, the discharge port 48 capable of passing the air from the inside of the developing container 41 to the outside of the developing container 41 is disposed in the upper direction of the agitating chamber 41*b*. Further, the air filter 49, serving as the catching member of the scattered toner, is disposed on the discharge port 48. Then, the air filter 49 catches the toner which is otherwise discharged outside the apparatus by being carried on the air flow Id. The air filter 49 of the present embodiment made of unwoven fabric with a thickness of 0.20 mm, and an air impermeability is 0.94 seconds at a pressure difference of 5 Pa (pascal) by the Gurley densometer method.

If the air impermeability is excessively large, such a filter is easily clogged while a toner capturing capability is high, and the internal pressure of the developing container 41 is increased. Then, although it is preferred to decrease the internal pressure of the developing container 41 by the air flow Id discharged from the discharge port 48, the internal pressure is decreased in a direction of the air flow Ib' discharged from the intake port 47, and the air with the high toner density is discharged outside the developing apparatus 4 from the intake port 47. That is, it is not possible to adequately suppress the scattering of the toner.

On the other hand, if the air impermeability is excessively small, the toner capturing capability is low, and there is a possibility of staining the recording material and the like caused by blowing out of the toner. In the present embodiment, as the air impermeability of the air filter 49, a range of equal to or longer than 0.1 second to equal to or shorter than 10 seconds at the pressure difference of 5 Pa by the Gurley densometer method is preferred. However, it is preferred that, depending on a configuration of the developing apparatus and conditions such as a particle size of toner and the like, the air filter 49 is appropriately selected by taking into consideration material, roughness of mesh, thickness, and the air impermeability of the air filter 49, and it is not limited to this. Further, it is preferred that the air filter 49 is exchangeable depending on working conditions of the developing apparatus 4.

As described above, in the present embodiment, the third communicating portion 1000 disposed in the partition wall 41*c*, which separates the developing chamber 41*a* and the agitating chamber 41*b* from each other, and connecting the developing chamber 41*a* and the agitating chamber 41*b* with each other over the whole area in the longitudinal direction is formed, and the discharge port 48 discharging the air inside the developing container 41 is formed in the developing container 41 (in the upper direction of the agitating chamber 41*b*). Therefore, by a difference between the internal pressure of the developing chamber 41*a*, where the internal pressure is increased by the air flowing into the inside of the developing container 41 from the intake port 47 by the rotation of the developing sleeve 44, and the internal pressure of the agitating chamber 41*b*, a part of the air flows from the developing chamber 41*a* into the agitating chamber 41*b* via the third communicating portion 1000 (Ie). Herewith, the internal pressure of the agitating chamber 41*b* is increased, and the air inside the agitating chamber 41*b* is discharged outside the developing apparatus 4 via the discharge port 48 disposed in the upper direction of the agitating chamber 41*b*.

At this time, a quantity of the air flowing in from the intake port 47 by the rotation of the developing sleeve 44 is treated as Ia. Further, a quantity of the air discharged outside the developing apparatus 4 via the intake port 47, a quantity of the air leaked from edges and the like, and a quantity of the air discharged outside the intake port 47 via the discharge port 48 are respectively treated as Ib', Ic, and Id. Then, a relationship expressed by a next formula (5) is satisfied.

[Formula 5]

$$Ia=Ib'+Ic+Id \quad (5)$$

That is, from the formulas (3) and (5) described above, it is possible to reduce the air flow rate discharged from the intake port 47 between the developing sleeve 44 and the upper lid 41*k*, via the vicinity of the peeling magnetic pole S3, by the quantity of the air flow Id (Ib'<Ib).

At this point, quantities of the released toners contained in the air flows Ib and Id will be described. Since the air flow Ib contains a large quantity of the released toner generated at the peeling magnetic pole S3 as described above, the density of the released toner in the air flow Ib is high. On the other hand, since the air flow Id passes via the agitating chamber 41*b* with a low released toner density, the density of the released toner in the discharged air is decreased. Further, before the air discharged to the discharge port 48 passing through the third communication portion 1000 and the agitating chamber 41*b* has reached an inlet 48*a* of the discharge port 48, the released toner receives force in the gravity direction, and is taken into the circulating developer again. Herewith, the released toner density of the air discharged from the discharge port 48 is decreased. That is, it is possible to decrease the quantity of the toner contained in the air discharged outside the developing container 41 from the inside of the developing container 41 via the discharge port 48 which is passable by the air. Further, since clogging of the air filter 49 covering the opening portion of the discharge port 48 by the toner is reduced by decreasing the quantity of the toner contained in the air discharged outside the developing container 41 from the inside of the developing container 41 via the discharge port 48, it is possible to extend a life of the air filter 49.

Further, since the initial developer is enclosed in the upper part of the agitating chamber 41*b* in the present embodiment, a wide space exists in the upper direction of the third communication portion 1000, and a path of the air flow from the third communication portion 1000 to the discharge port 48 is lengthened. Therefore, before the air discharged from the discharge port 48 passing through the third communication portion 1000 and the agitating chamber 41*b* has reached the discharge port 48, a period of time during which the released toner receives the force in the gravity direction is lengthened, and the released toner contained in the air drops more easily. As a result, it is possible to further decrease the released toner density of the air discharged from the discharge port 48.

As described above, it is possible to reduce the scattering of the toner from the intake port 47 by disposing the third communication portion 1000 connecting the developing chamber 41*a* and the agitating chamber 41*b* with each other over the whole area in the longitudinal direction and the discharge port 48 discharging the air outside the developing apparatus 4 in the agitating chamber 41*b*. As a result, by the present embodiment, it is possible to furnish the developing apparatus capable of reducing the scattering of the toner.

To be noted, the communicating port through which the initial developer accommodating chamber 50 and the agitating chamber 41*b* are communicated with each other is disposed at a low position so as to enclose the initial developer in the initial developer accommodating chamber 50 as much as possible. Therefore, as shown in FIG. 8, in the present embodiment, an uppermost edge 1001 of the third communicating portion 1000 is disposed below a part 41*c*21, on the side of the partition wall 41*c*, of the sticking portion where the initial developer sealing sheet 60 is stuck, in the vertical direction. That is, as shown in FIG. 8, in the present embodiment, the uppermost edge 1001 of the third communicating portion 1000 is disposed below the part 41*c*21, on a side of the second wall portion 41*c*2 of the upper lid 41*k*, out of the second wall portion 41*c*2 and the extended portion 41*k*2 of the upper lid 41*k*, in the vertical direction.

Further, as shown in FIG. 8, in the present embodiment, a lowermost edge of the third communicating portion 1000 is disposed above the rotational axes of the first and second conveyance screws 43*a* and 43*b* in the vertical direction.

Experiment

An experiment carried out so as to confirm an effect of the present embodiment described above will be described. In the experiment, a configuration of the present embodiment (example) as shown in FIG. 7 and a configuration excluding the third communicating portion 1000, the discharge port 48, and the air filter 49 from the configuration of FIG. 7 (comparative example) are prepared, and a quantity of the scattered toner in each case is examined.

The scattered toner of the developing apparatus 4 scatters outside by mainly passing through the intake port 47. Therefore, a line laser is irradiated approximately in the center of the air flow so as to become perpendicular to the developing sleeve 44. The line laser is a laser which forms an optical path of a fan-shaped two-dimensional plane by irradiating with a laser beam of a fixed width linearly. The scattered toner flying on the optical path of the line laser scatters the laser beam. Therefore, it is possible to measure a number of particles and a trajectory of the scattered toner existing within an irradiated area of the laser by observing with a high-speed camera and the like from a direction approximately perpendicular to an irradiation direction of the line laser.

A YAG (yttrium aluminum garnet) laser manufactured by Japan Laser Corporation is used as an illuminant of the line laser, and is irradiated by adjusting a cylindrical lens so as to obtain a line width of 0.5 mm. A high-speed camera SA-3 manufactured by Photron, Ltd., is used for observation, and settings (such as a frame rate and an exposure time) and an optical system (such as lens) of the high-speed camera are selected so that it is possible to observe the scattered toner on the optical path of the line laser.

By such a method as described above, a number of the scattered toners from the center in the longitudinal direction (rotational axis direction) of the developing sleeve 44 are measured, and are converted into the number of the scattered toners corresponding to a sheet of the A4 sheet based on the line width and an observation time.

Figure 11:
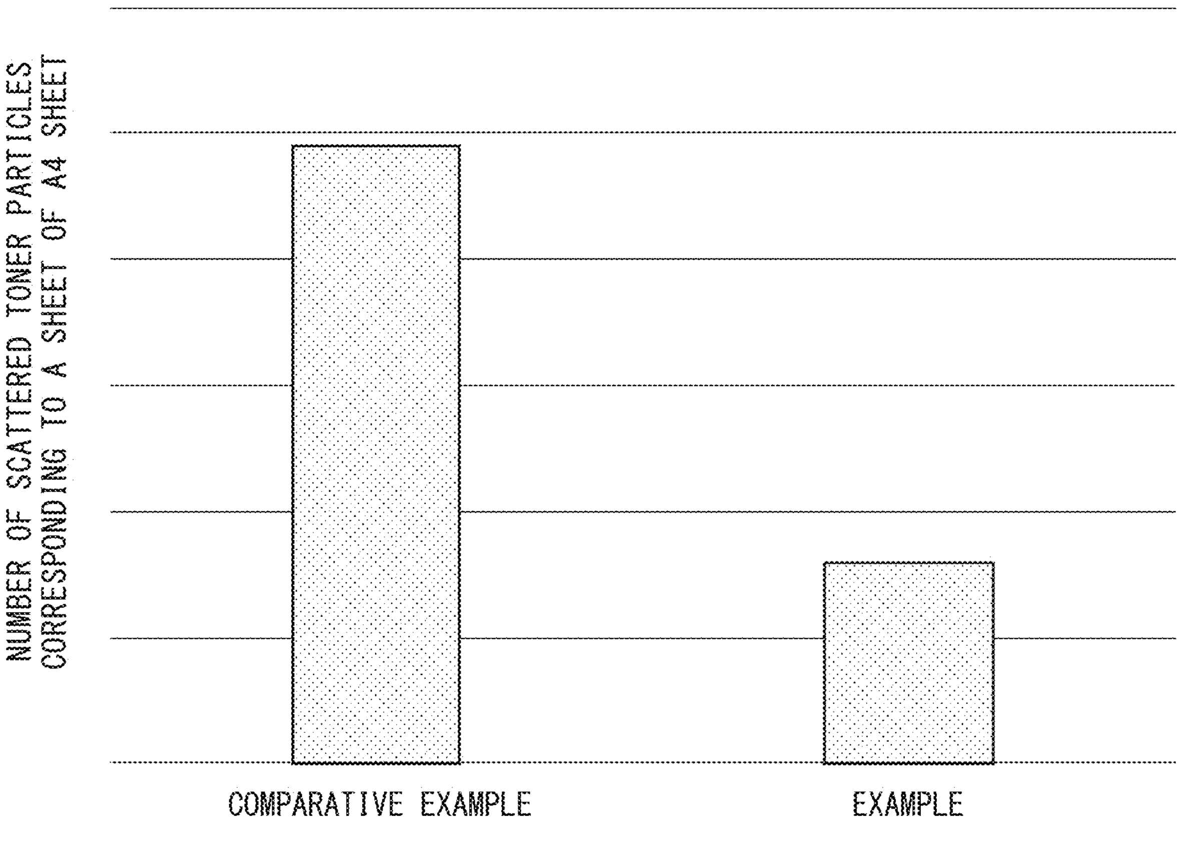
FIG. 11 is a graph showing a comparison of numbers of scattered toner particles in a comparative example and the example.

Results of the measured numbers of the scattered toners in the comparative example and the example are shown in FIG. 11. As clearly shown in FIG. 11, it is possible to reduce the number of the scattered toners by applying the configuration of the example, which is the configuration of the present embodiment.

Other Embodiments

While the embodiment mentioned above has been described in a case where the printer is used as the image forming apparatus, the present invention is applicable to a copy machine, a facsimile, a compound machine, and the like other than the printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128591, filed Jul. 29, 2020 and Japanese Patent Application No. 2021-107354, filed Jun. 29, 2021, which are hereby incorporated by reference herein in their entirety.

What is claimed is:

1. A developing apparatus comprising:

a rotatable developing member configured to bear and convey developer containing a toner and a carrier so as to develop an electrostatic latent image formed on an image bearing member;

a developing container configured to accommodate the developer, the developing container comprising a first chamber supplying the developer to the rotatable developing member, a second chamber, and a partition wall separating the first chamber and the second chamber, the developer circulating between the first chamber and the second chamber;

a first communicating portion configured to allow the developer to move from the second chamber to the first chamber;

a second communicating portion configured to allow the developer to move from the first chamber to the second chamber;

a first conveyance screw disposed in the first chamber, and configured to convey the developer in a first direction from the first communicating portion toward the second communicating portion;

a second conveyance screw disposed in the second chamber, and configured to convey the developer in a second direction from the second communicating portion toward the first communicating portion; and a third communicating portion disposed downstream of the first communicating portion and upstream of the second communicating portion in the first direction, disposed above a rotational axis of the first conveyance screw and a rotational axis of the second conveyance screw in a vertical direction, wherein the developing container further comprises a third chamber disposed above the second chamber in the vertical direction, wherein an opening portion for discharging air inside the developing container to outside of the developing container is provided in the third chamber, the opening portion being disposed above the third communication portion, wherein in a sealing state where a sealing member is stuck to the developing container, the second chamber is not in communication with the third chamber and initial developer is sealed in the third chamber by the sealing member stuck to the developing container, the air inside the developing container communicates between the first chamber and the second chamber through the third communicating portion, and the air inside the developing container does not communicate between the second chamber and the third chamber, and wherein in an unsealed state where the sealing member is not stuck to the developing container, the second chamber is in communication with the third chamber and the initial developer is not sealed in the third chamber, the air inside the first chamber is allowed to move into the second chamber through the third communication portion, the air inside the second chamber is allowed to move into the third chamber, and the air inside the third chamber is able to be discharged to outside of the developing container through the opening portion.

2. The developing apparatus according to claim 1, wherein the developing container comprises a first case portion configured to accommodate the developer and a second case portion fitted to the first case portion and configured to cover a part of an outer circumferential surface of the rotatable developing member, the first conveyance screw and the second conveyance screw being disposed in the first case portion, and wherein the third chamber is disposed in the second case portion.

3. The developing apparatus according to claim 1, wherein in the sealing state, the opening portion is able to discharge the air inside the third chamber to outside of the developing container.

4. The developing apparatus according to claim 1, wherein in the sealing state, an uppermost edge of the third communicating portion is disposed below a part, on a side of the partition wall, of a sticking portion in the vertical direction, the sticking portion being a portion where the sealing member is stuck to the developing container.

5. The developing apparatus according to claim 1, further comprising a magnet non-rotatably fixedly disposed inside the rotatable developing member, the magnet comprising a first magnetic pole and a second magnetic pole, the second magnetic pole being disposed downstream of the first magnetic pole in a rotational direction of the rotatable developing member, the first magnetic pole and the second magnetic pole being disposed adjoiningly to each other and having a same polarity, wherein an uppermost edge of the third communicating portion is disposed below a position where a magnetic flux density of the first magnetic pole in a normal direction of the rotatable developing member becomes maximum, in the vertical direction.

6. The developing apparatus according to claim 1, wherein the third communicating portion is formed across an area equal to or more than 90% of an area between a downstream end of the first communicating portion and an upstream end of the second communicating portion in the first direction.

7. The developing apparatus according to claim 1, wherein a filter configured to catch the toner is disposed in the opening portion.

8. The developing apparatus according to claim 7, wherein a filter cover configured to cover the filter is disposed above the filter in the vertical direction so as to overlap with the filter.

9. The developing apparatus according to claim 1, wherein in the sealing state, air is movable between the third chamber and outside of the developing container through the opening portion.

* * * * *